Figure 1:
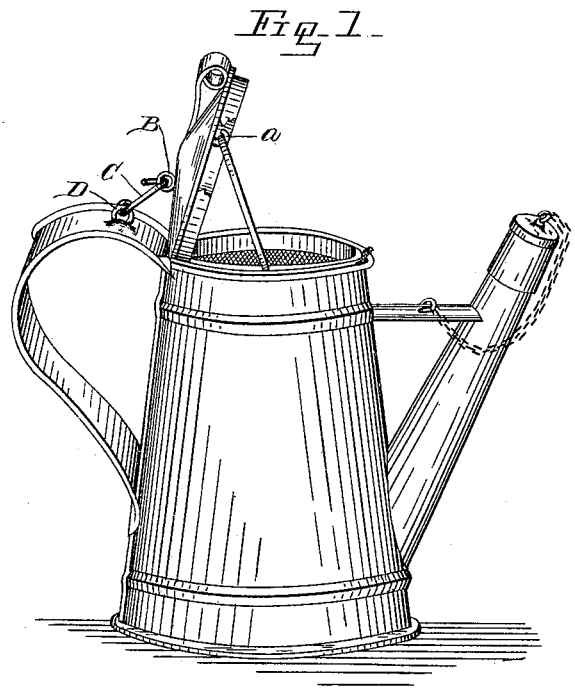
Figure 2:
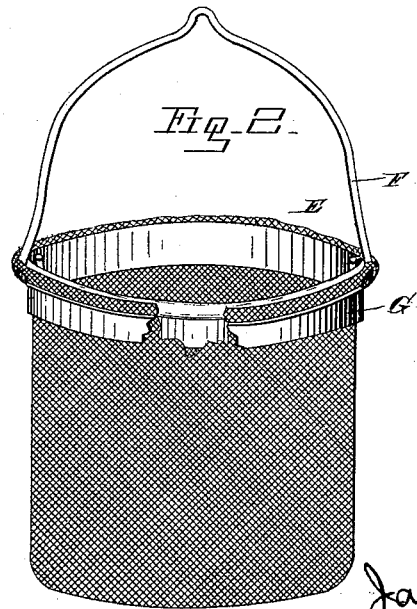

(No Model.)

J. O. WILSON & J. B. COE.
COFFEE POT.

No. 353,909. Patented Dec. 7, 1886.

WITNESSES:
Howard J. Schrader.
Edmund A. Strause.

INVENTORS,
James O. Wilson,
James B. Coe.
By Frank Sheehy
ATTORNEY.

UNITED STATES PATENT OFFICE.

JAMES O. WILSON AND JAMES B. COE, OF CLAYTON, ILLINOIS.

COFFEE-POT.

SPECIFICATION forming part of Letters Patent No. 353,909, dated December 7, 1886.

Application filed May 18, 1886. Serial No. 202,531. (No model.)

*To all whom it may concern:*

Be it known that we, JAMES O. WILSON and JAMES B. COE, citizens of the United States, residing at Clayton, in the county of Adams and State of Illinois, have invented certain new and useful Improvements in Coffee-Pots; and we do declare the following to be a full, clear, and exact description of the invention, such as will enable others skilled in the art to which it appertains to make and use the same, reference being had to the accompanying drawing, and to the letters and figures of reference marked thereon, which form a part of this specification.

This invention is an improvement in coffee-pots; and it consists, in combination with a coffee-pot, of certain devices for suspending and holding the coffee-bag in proper position within the pot, and holding the cover open, as will be hereinafter more fully set forth, and particularly pointed out in the claim appended.

An important desideratum in this class of devices has been to provide a means whereby the sack or bag may be held at the mouth of the pot, and the cover simultaneously held out of the way to permit delivery of the coffee to the sack. To accomplish this at a minimum expense is the object of this invention.

In the accompanying drawing, A indicates a coffee-pot, which may be that of any ordinary or approved form, with a hinged cover. To the under or inner side of this cover, forwardly of its center, we secure a hook, *a*, which we arrange so that when the cover is raised the upper edge of the sack, which is suspended by its bail from the hook, will be brought up even with the upper edge or mouth of the pot.

B indicates a ring on the upper or outer side of the cover, and slightly in rear of the central point, to receive a hook, C, the opposite end of which is attached to a ring, D, fixed to the upper curved portion of the handle, as shown. This hook C is of a length sufficient to hold the cover of the pot raised vertically, or nearly so, and when the cover is held in such position the mouth of the suspended bag is designed to be brought to the upper edge of the pot.

E indicates the sack-frame, which is composed of a sheet-metal band having its upper edge shouldered, as indicated, and provided at diametrically-opposite points with perforations for the attachment of the bail F. The length of this bail is so proportioned with relation to the length of the hook C, and the location of the hook *a* and eye B, that when the cover is raised and secured by the said hook C the mouth of the bag will be brought to the upper edge of the pot, as before described.

The sack, which may be formed of muslin or the like material, is placed with its mouth over this band, and is held in position thereon by a flexible metallic ring, G. By this construction it will be seen that the bag or sack may be removed and readily replaced by first slipping off the ring. This construction will be found very convenient when the sack may become worn or soiled and it is desired to remove and clean the same or substitute another. When the cover of the pot has been raised in the position shown in the drawing, it will be seen that the hook will hold the same open, and the sack at the mouth of the vessel, which will be in a convenient position to receive the coffee, and will prevent the steam from rising and burning the hands.

Having described this invention, what we claim as new, and desire to secure by Letters Patent, is—

The combination, with a coffee-pot and its handle, of the ring on the upper side of the handle, the hook C, the hinged cover having the eye or ring B on its upper side rearwardly of its center, the hook on the under side of the cover forwardly of its center, and the bag having the bail of the length described, and suspended from the hook on the under side of the cover, substantially as specified.

In testimony whereof we affix our signatures in presence of two witnesses.

JAMES O. WILSON.
JAMES B. COE.

Witnesses:
HENRY BARTLETT,
W. T. HEDENBERG.